United States Patent
Aihara

[19]

[11] Patent Number: 5,771,765
[45] Date of Patent: Jun. 30, 1998

[54] SAWDUST REMOVING APPARATUS FOR SAW MACHINE

[75] Inventor: Shouji Aihara, Hiratsuka, Japan

[73] Assignee: Amada Company, Limited, Kanagawa, Japan

[21] Appl. No.: 824,259

[22] Filed: Mar. 26, 1997

Related U.S. Application Data

[63] Continuation of Ser. No. 335,366, Nov. 3, 1994, abandoned.

[51] Int. Cl.[6] ............................ B23D 59/00; B27B 13/16
[52] U.S. Cl. ............................... 83/168; 83/101; 83/788; 15/21.1; 15/256.5
[58] Field of Search ................................. 15/21.1, 256.5; 83/168, 796, 788, 101

[56] References Cited

U.S. PATENT DOCUMENTS

| | | |
|---|---|---|
| 2,466,644 | 4/1949 | McBride . |
| 2,953,952 | 9/1960 | Alexander . |
| 3,485,123 | 12/1969 | Komendowski ........................... 83/168 |
| 3,754,490 | 8/1973 | Sata et al. .................................. 83/168 |
| 4,478,120 | 10/1984 | Sugimoto ................................. 83/796 |
| 4,479,410 | 10/1984 | Taguchi .................................... 83/796 |
| 4,606,251 | 8/1986 | Boileau .................................... 83/168 |
| 4,633,999 | 1/1987 | Perneczky .............................. 15/256.5 |
| 4,805,500 | 2/1989 | Saito et al. ................................ 83/168 |
| 5,440,960 | 8/1995 | Sadahiro .................................. 83/168 |

FOREIGN PATENT DOCUMENTS

| | | |
|---|---|---|
| A-0565719 | 10/1993 | European Pat. Off. . |
| A-1814412 | 7/1970 | Germany . |
| 93/08948 | 5/1993 | WIPO . |

OTHER PUBLICATIONS

European Search Report dated Mar. 29, 1995.

*Primary Examiner*—Eugenia Jones
*Assistant Examiner*—Charles Goodman
*Attorney, Agent, or Firm*—Wigman, Cohen, Leitner & Myers, P.C.

[57] ABSTRACT

A sawdust removing apparatus for a saw machine includes: a saw blade housing (9) for rotatably supporting a saw blade (15) for sawing work (W); a cleaning instrument (19) for removing sawdust adhering to the saw blade when work is being sawed; a cleaning instrument support member (21) pivotally supported by the saw housing for rotatably supporting the cleaning instrument; a cleaning instrument position adjusting device (23, 71) mounted on the saw housing for adjusting an overlap rate of the cleaning instrument with the saw blade; and a cleaning instrument position fixing device (25) mounted on the saw housing for fixing the cleaning instrument support member after the overlap rate of the cleaning instrument with the saw blade has been adjusted by the cleaning instrument position adjusting device. In the sawdust removing apparatus, since the cleaning instrument can be adjustably fixed any distance away from the saw blade by use of the cleaning instrument position adjusting device (23, 71) and the cleaning instrument position fixing device (25), it is possible to adjust the overlap rate of the cleaning instrument with the saw blade and further to prevent the cleaning instrument from being vibrated by the saw blade. Further, since a cleaning instrument separate device (hydraulic cylinder) (81) and a cleaning instrument life time sensor (proximity switch) (79) are provided, the cleaning instrument can be kept away from the saw blade when work is not being sawed and further the cleaning instrument can be replaced with a new one in a timely manner.

12 Claims, 6 Drawing Sheets

SAWDUST REMOVING APPARATUS FOR SAW MACHINE

This is a continuation of application Ser. No. 08/335,366, filed on Nov. 3, 1994, now abandoned.

BACKGROUND OF THE INVENTION

1. Field of the Invention

The present invention relates to a sawdust removing apparatus used with various saw machines such as horizontal band saw machine, vertical band saw machine, circular saw machine, etc., and more specifically to a sawdust removing apparatus which can prevent a cleaning instrument such as a sawdust removing brush from being vibrated and worn off unnecessarily, while reducing a torque for rotating the cleaning instrument. Here, "sawdust" implies scraps or swarf of material produced when work is being sawed.

2. Description of the Related Art

When work is being sawed by use of a saw blade such as band saw blade, circular saw blade, etc. attached to a saw machine, sawdust is inevitably produced and adhere to the saw blade. Therefore, the saw machine is generally provided with a rotary cleaning instrument for cleaning the tooth portion of the saw blade, as disclosed in PCT International Publication No. WO93/08948. This conventional art document discloses a sawdust removing device as follows: a cleaning instrument support member for rotatably supporting a cleaning instrument is always urged toward the saw blade by an elastic force of a spring to bring the cleaning instrument into contact with a stopper member fixed at a predetermined distance away from the tooth portion of the saw blade, so that the amount of overlap of the cleaning instrument with the saw blade can be kept always at a constant value. In the conventional art sawdust removing device, since the overlap of the cleaning instrument with the saw blade can be maintained at a constant value, it is possible to remove sawdust from the saw blade under excellent condition.

In the conventional art sawdust removing device, however, since the cleaning instrument is always kept urged toward the stopper member by the spring and is not fixed, there exists a problem in that the cleaning instrument is apt to be inevitably vibrated in accord with the saw blade vibration, and further the cleaning instrument is worn off considerably. Further, the cutting precision deteriorates in particular when the cleaning instrument vibration frequency is resonant to the saw blade vibration frequency. In addition, since the cleaning instrument is always kept urged toward the stopper member, there exists another problem in that a relatively large rotational power is required for rotating the cleaning instrument.

SUMMARY OF THE INVENTION

With these problems in mind, therefore, it is the first object of the present invention to provide a sawdust removing apparatus for a saw machine, which can prevent the cleaning instrument from being vibrated when the saw blade is being vibrated.

Further, the second object of the present invention is to provide a sawdust removing apparatus for a saw machine, which can prevent the cleaning instrument from being worn off unnecessarily.

To achieve the above-mentioned objects, the present invention provides a sawdust removing apparatus for a saw machine, comprising: a saw blade housing (9) for rotatably supporting a saw blade (15) for sawing work (W); a cleaning instrument (19) for removing sawdust adhering onto the saw blade when work is being sawed; a cleaning instrument support member (21) pivotally supported by said saw blade housing for rotatably supporting said cleaning instrument; cleaning instrument position adjusting means (23, 71) mounted on said saw blade housing for adjusting an amount of overlap of said cleaning instrument with the saw blade; and cleaning instrument position fixing means (25) mounted on said saw blade housing for fixing said cleaning instrument support member after the overlap of said cleaning instrument with the saw blade has been adjusted by said cleaning instrument position adjusting means.

The sawdust removing apparatus further comprises cleaning instrument separating means (81) for pivoting the cleaning instrument support member (21) to separate said cleaning instrument from said saw blade when work is not sawed. Further, the sawdust removing apparatus comprises cleaning instrument life time sensing means (79) interposed between said saw blade housing (9) and the cleaning instrument support member (21) for detecting wear of said cleaning instrument. Further, the sawdust removing apparatus comprises cleaning instrument life time sensing means (79) interposed between said saw blade housing (9) and said cleaning instrument blush (19) via a lever (111) for detecting wear of said cleaning instrument. Further, the sawdust removing apparatus comprises a cleaning instrument spring (65, 99) interposed between said saw blade housing (9) and said cleaning instrument support member (21) for urging said cleaning instrument toward the saw blade.

Further, in the sawdust removing apparatus according to the present invention, the cleaning instrument position adjusting means (23, 71) comprises: a pivotal cleaning instrument stopper member (23); and a hydraulic cylinder (71) for actuating said pivotal cleaning instrument stopper member toward and away from an outer circumferential surface of said cleaning instrument. Further, the cleaning instrument position fixing means (25) comprises: a push member (37); and a hydraulic cylinder device (33, 35) interposed between said saw blade housing (9) and said cleaning instrument support member (21) for urging said push member against said cleaning instrument support member to fix said cleaning instrument support member to said saw blade housing. Further, the cleaning instrument position adjusting means (23, 71) and said cleaning instrument position fixing means (25) are combined with each other. Further, the combined cleaning instrument position adjusting and cleaning instrument position fixing means comprises: a hydraulic cylinder (93); a piston rod (93R) movably fitted to said hydraulic cylinder; a brake lever member (91) associated with one end of said piston rod for braking a pivotal motion of said cleaning instrument support member (21) relative to said saw blade housing when said hydraulic cylinder is actuated; and a moving lever member (95) associated with the other end of said piston rod for moving a pivotal cleaning instrument stopper member (23) of said cleaning instrument position adjusting means (23, 71) away from said cleaning instrument (19) when said hydraulic cylinder is actuated. Further, the cleaning instrument separating means (81) is a hydraulic cylinder or a gear mechanism (101, 109) interposed between said saw blade housing (9) and said cleaning instrument support member (21) for moving said cleaning instrument toward and away from the saw blade. Further, the cleaning instrument life time sensing means (79, 117) is a proximity switch. Further, the cleaning instrument (19), said cleaning instrument support member (21), said cleaning instrument position adjusting means (23, 71) and said cleaning instrument position fixing means (25) are all assembled together and mounted on said saw blade housing as a unit.

In the sawdust removing apparatus according to the present invention, when work W is being sawed, since the cleaning instrument support member 21 can be fixed at an appropriate position away from the saw blade 15 by the cleaning instrument position fixing device 25, it is possible to prevent the cleaning instrument 19 from being vibrated by the saw blade 15, so that it is possible to prevent the cutting precision from being lowered due to vibration, and further to prevent the cleaning instrument 19 from being worn off excessively.

Further, since the overlap of the cleaning instrument 19 with the saw blade 15 can be adjusted by the cleaning instrument position adjusting device 23 and 71 to any required value, and further since the pivotal cleaning instrument stopper member 23 can be moved between the adjustment position (at which the cleaning instrument movement is restricted) and the separation position (at which the cleaning instrument 19 is kept away from the pivotal cleaning instrument stopper member 23), it is possible to prevent the cleaning instrument 19 from being worn off unnecessarily by the pivotal cleaning instrument stopper member 23 without any contact resistance between the cleaning instrument 19 and the pivotal cleaning instrument stopper member 23, so that the cleaning instrument 19 can be rotated smoothly.

Further, when work W is not sawed by the saw blade 19, since the cleaning instrument 19 can be separated from the saw blade 15 by the cleaning instrument separating device (the hydraulic cylinder 81 or the gear mechanism 101 and 108) via the cleaning instrument support member 21, it is possible to prevent the cleaning instrument 19 from being worn off unnecessarily and thereby to improve the life time of the cleaning instrument 19.

Further, since the cleaning instrument life time sensor 79 for detecting the life time (wear limit) of the cleaning instrument 19 is provided, it is possible to detect the timing at which the cleaning instrument 19 must be replaced with a new one, so that sawdust produced by the saw blade 15 can be removed securely.

Furthermore, the sawdust removing apparatus according to the present invention can be mounted on the cleaning instrument unit base 27 all together, and it is possible to manufacture and mount the sawdust removing apparatus on the conventional saw blade housing 9, that is, the conventional saw machines of any types, without need of any additional modification of the saw machine.

DETAILED DESCRIPTION OF THE EMBODIMENTS

Figure 1:
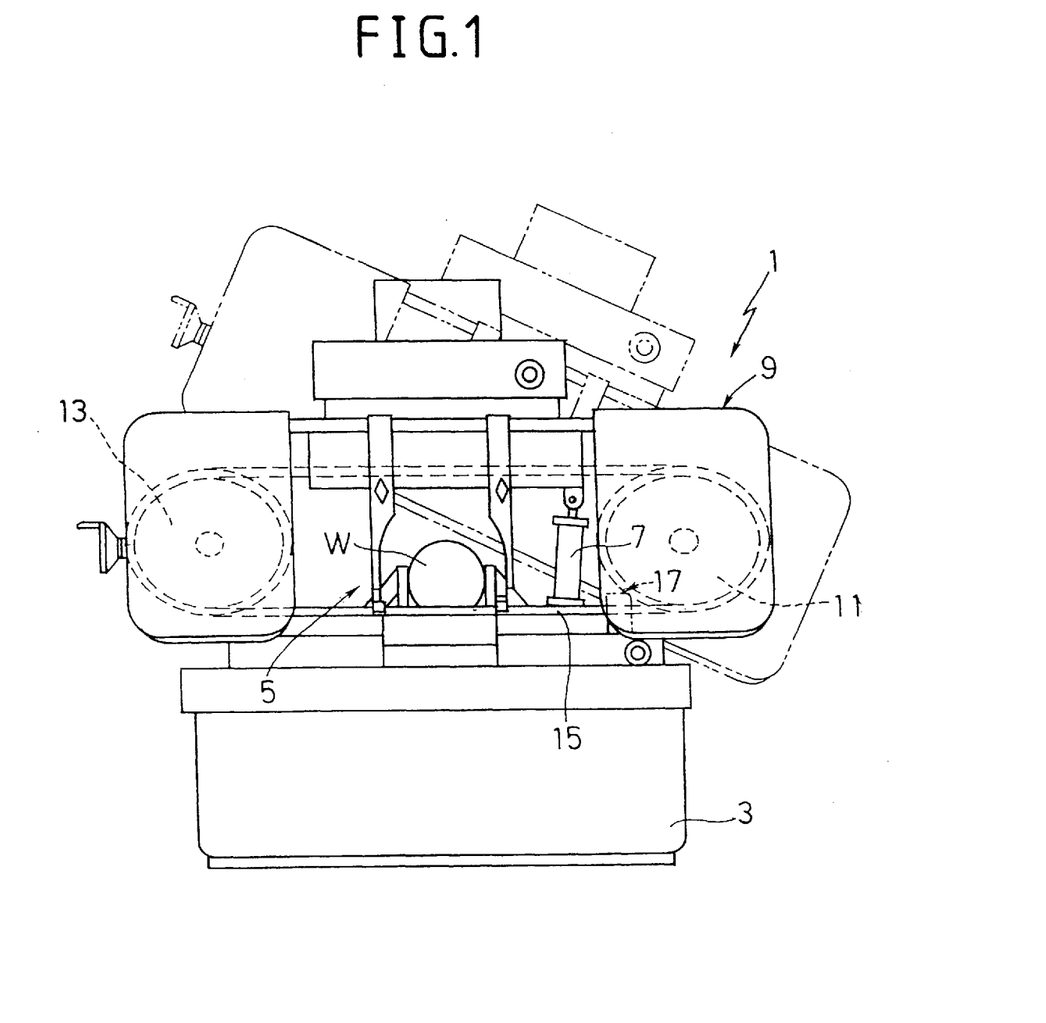
FIG. 1 is a front view showing a horizontal band, as an example of the saw machine.

Prior to the description of the present invention, the entire structure of the horizontal band saw machine will be briefly explained by way of example, with reference to FIG. 1.

In FIG. 1, a horizontal band saw machine 1 is provided with a base 3, on which a vice device 5 is mounted to removably fix work W to be sawed. Further, on the base 3, a saw blade housing 9 is supported so as to be pivotal clockwise or counterclockwise (movable up and down relative to the work W) by a lift cylinder 7.

In the saw blade housing 9, a drive wheel 11 and a driven wheel 13 are both rotatably disposed. Further, a band saw blade 15 of endless shape is received around the two wheels 11 and 13.

The above-mentioned horizontal band saw machine 1 is well known. Therefore, the further detailed description of the structure and the operation thereof is omitted herein.

A sawdust removing apparatus 17 according to the present invention is mounted on an appropriate position of the saw blade housing 9, as shown by dashed lines in FIG. 1. This sawdust removing apparatus 17 is used to remove sawdust adhering to the band saw blade 15 when the work W is being sawed by the band saw blade 15. Therefore, it is preferable to locate the sawdust removing apparatus 17 at such a position that sawdust can be removed from the band saw blade 15 immediately after the band saw blade 15 has passed through the work W. Without being limited thereto, however, since the sawdust removing apparatus 17 is used to remove only the sawdust, it is possible to mount the sawdust removing apparatus 17 at any desired position of the saw blade housing 9.

Further, although the horizontal band saw machine 1 has been explained by way of example in FIG. 1, without being limited thereto, the sawdust removing apparatus can be of course mounted on the other vertical band saw machine and circular saw machine.

Now, the structure of the sawdust removing apparatus 17 according to the present invention will be described in detail hereinbelow.

Figure 2:
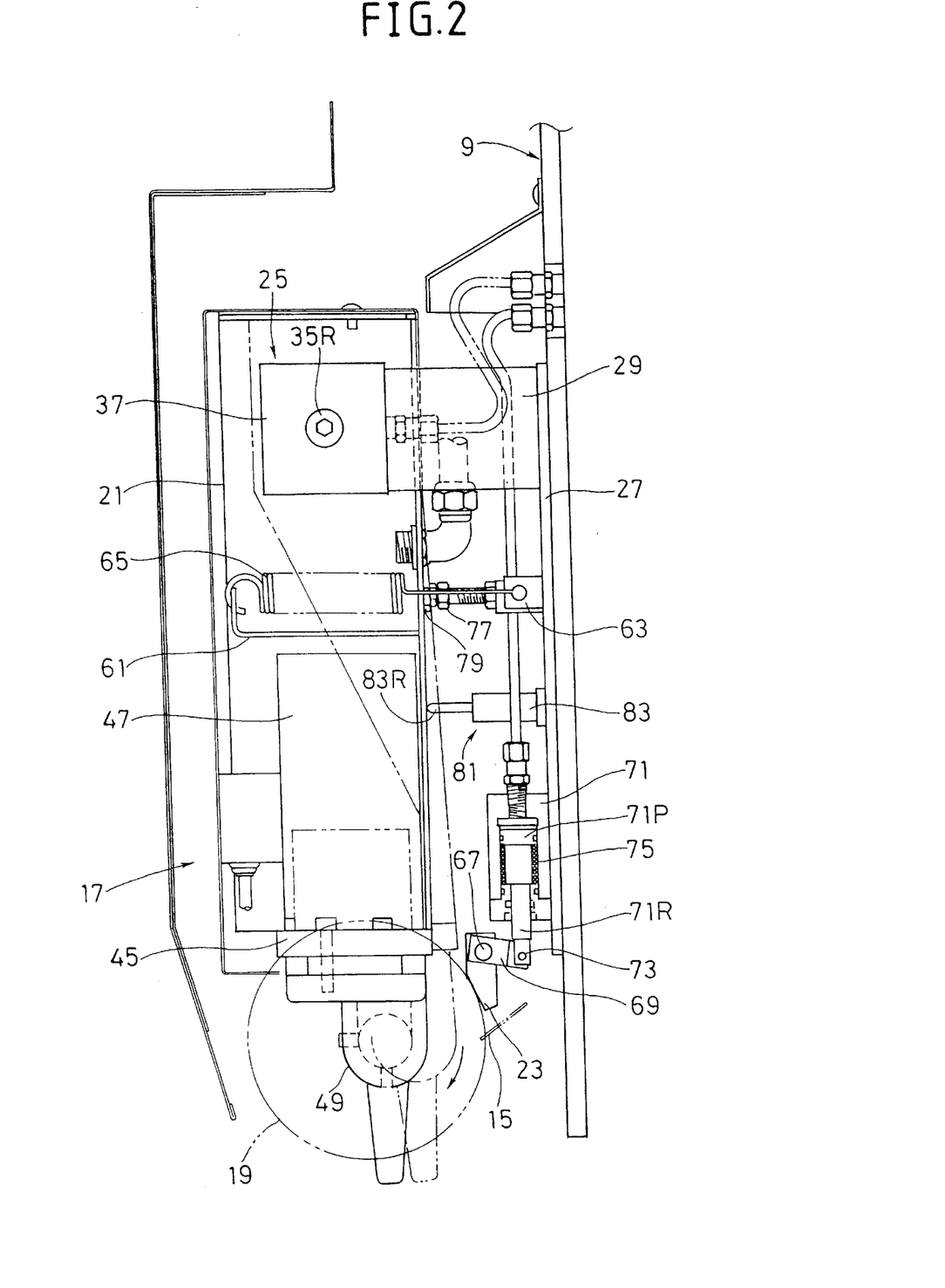
FIG. 2 is a side, partially cross-sectional view showing a first embodiment of the sawdust removing apparatus for a saw machine according to the present invention.
Figure 3:
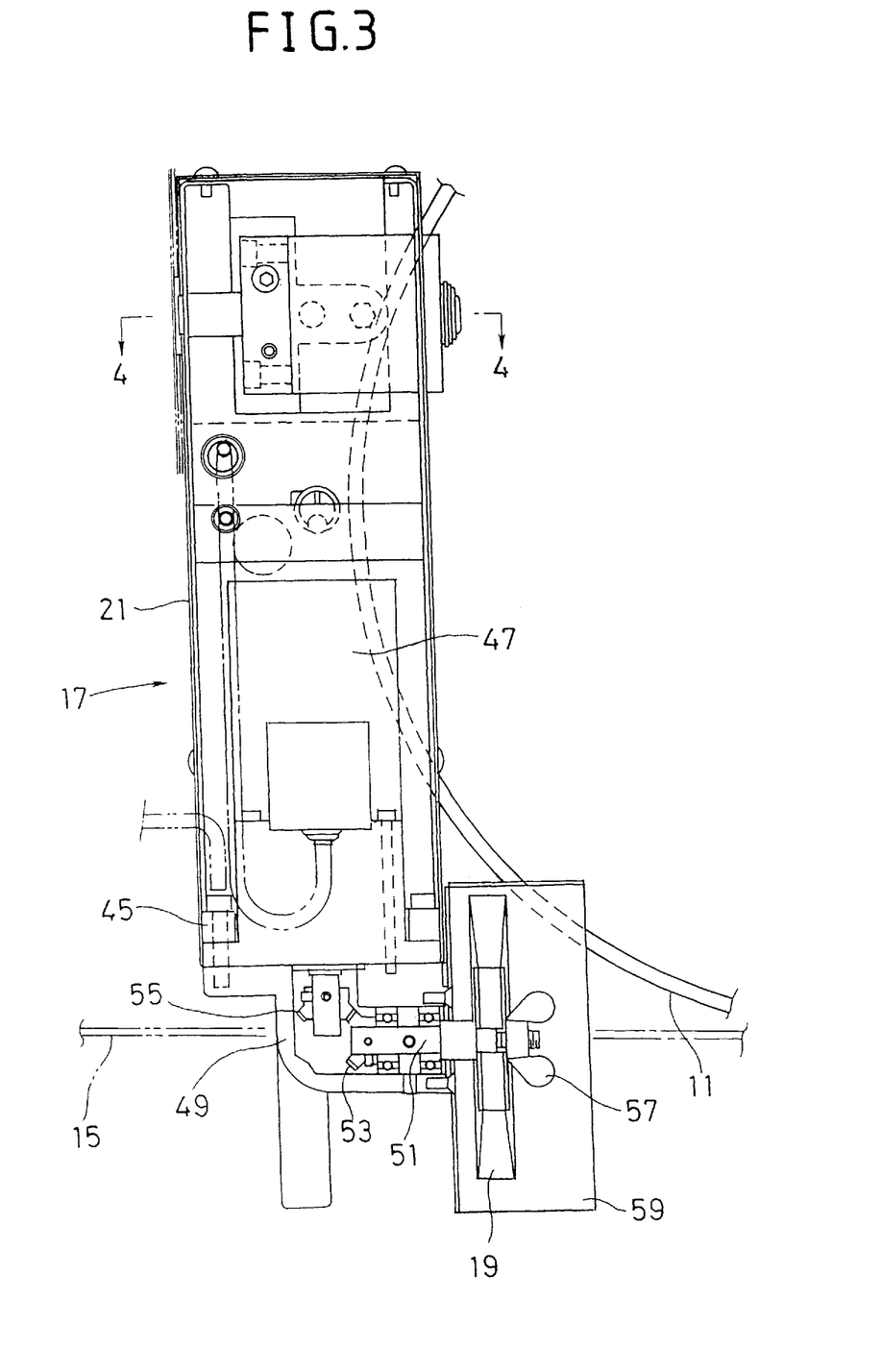
FIG. 3 is a front, partially cross-sectional view showing the same sawdust removing apparatus for a saw machine according to the present invention.

With reference to FIGS. 2 and 3, the sawdust removing apparatus 17 is composed of the saw blade housing 9 for rotatably supporting the saw blade 15, for cutting off the work W; a cleaning instrument 19 such as a brush for removing sawdust adhering onto the saw blade 15 when work is being sawed; a cleaning instrument support member 21 pivotally supported by the saw blade housing 9 for rotatably supporting the cleaning instrument 19; an adjustable cleaning instrument stopper device (cleaning instrument position adjusting means) 23 and 71 mounted on the saw blade housing 9, for adjusting an overlap of the cleaning instrument 19 with the tooth portion of the saw blade 15 between an adjustment position in contact with the cleaning instrument 19 and a remote position away from the cleaning instrument 19; and a cleaning instrument position fixing device 25 mounted on the saw blade housing 9 for fixing a pivotal cleaning instrument support member 21 after the overlap has been adjusted by the adjustable cleaning instrument stopping device 23 and 71.

In accordance with a feature of the sawdust removing apparatus according to the present invention, the pivotal position of the cleaning instrument support member 21 (that is, the overlap of the cleaning instrument with the saw blade 15) can be adjusted by use of the adjustable cleaning instrument stopping device 23 and 71. Further, after the overlap has been once adjusted, the cleaning instrument support member 21 is fixed by the cleaning instrument position fixing device 25, and after that the pivotal cleaning instrument stopping device 23 is kept away from the cleaning instrument.

In more detail, in FIG. 2, a bracket 29 is fixed to the upper portion of a cleaning instrument unit base 27 attached to the saw blade housing 9. The cleaning instrument support member 21 is pivotally supported by the bracket 29 at an end portion thereof. Further, the cleaning instrument position fixing device 25 for fixing the cleaning instrument support member 21 to the bracket 29 is mounted also on the bracket 29.

Figure 4:
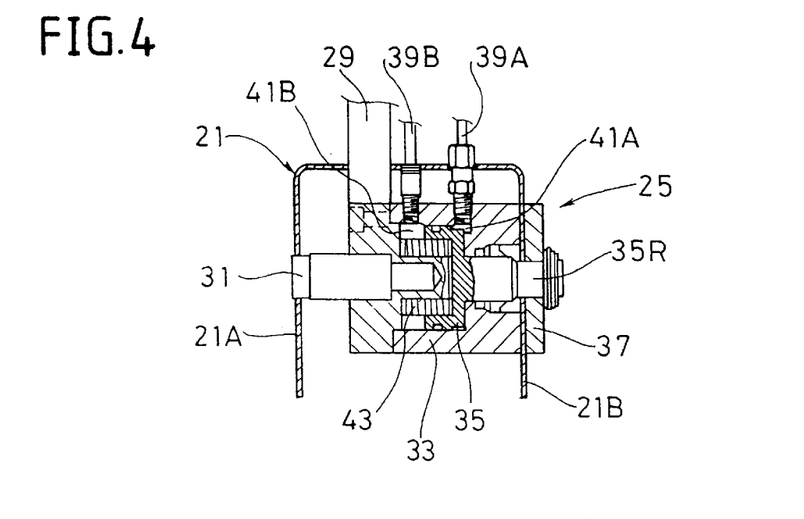
FIG. 4 is an enlarged cross-sectional view, taken along the line 4—4 in FIG. 3.

First, the cleaning instrument position fixing device 25 is first described in detail with reference to FIG. 4. A hinge pin 31 extending in the horizontal direction is fixed to one (the left) side surface of an end of the bracket 29. One side portion 21A of the cleaning instrument support member 21 (whose cross-sectional shape is reverse U-shaped) is pivotally supported by this hinge pin 31. On the other (the right) side of the end of the bracket 29, a cylinder block 33 is mounted with bolts. A piston 35 is fitted into this cylinder block 33. The piston 35 is formed with a piston rod 35R coaxial with the piston 35. The piston rod 35R is loosely passed through the other end portion 21B of the cleaning instrument support member 21. Further, a push member 37 is mounted on the end of the piston rod 35R so as to push the other side portion 21B of the cleaning instrument support member 21 against the cylinder block 33 when the piston 35 is actuated.

In the above-mentioned construction of the cleaning instrument position fixing device 25, therefore, when a working fluid is supplied into a cylinder chamber 41A of the cylinder block 33 through one fluid pipe 39A, since the piston rod 35R is retracted into the cylinder block 33 against the urging force of spring 43, the other side portion 21B of the cleaning instrument support member 21 is urged against the cylinder block 33 by the push member 37, so that it is possible to clamp the other side portion 21B of the cleaning instrument support member 21 between the cylinder block 33 and the push member 37, that is, to fix the cleaning instrument support member 21 to the bracket 29.

On the other hand, when working fluid is supplied into the cylinder chamber 41B of the cylinder block 33 through the other fluid pipe 39B, since the piston rod 35R is projected from the cylinder block 33, the cleaning instrument support member 21 is released from the fixed portion by the push member 37, so that the cleaning instrument support member 21 can be pivoted clockwise or counterclockwise in FIG. 2.

Further, in the above construction, when a spring is elastically disposed within a cylinder chamber 41B (opposite side to the cylinder chamber 41A) of the cylinder block 33 of the cleaning instrument position fixing device 25, it is possible to omit the fluid pipe 39B. In contrast with this, when a spring is elastically disposed within the cylinder chamber 41A (opposite side to the cylinder chamber 41B) of the cylinder block 33 of the cleaning instrument position fixing device 25, it is possible to omit the fluid pipe 39A. In this latter case, the cleaning instrument support member 21 is fixed to the bracket 29 by an elastic force of the spring disposed in the cylinder chamber 41A.

With reference to FIGS. 2 and 3 again, at the lower portion of the cleaning instrument support member 21, a motor bracket 45 is fixed. On this motor bracket 45, a motor 47 is mounted. A gear box 49 is attached to the lower portion of the motor 47. A rotary axle 51 (see FIG. 3) extending in the horizontal direction is supported by the gear box 49.

To an end of the rotary axle 51, a bevel gear 53 is fixed. This bevel gear 53 is in mesh with another bevel gear 55 fixed to a drive shaft of the motor 47. On the other hand, to the other end of the rotary axle 51, a cleaning instrument 19 is exchangeably attached with a mount (wing) nut 57. Further, a part of the circumference of the cleaning instrument 19 is covered with a semi-cylindrical safety cover 59 attached to the cleaning instrument support member 21.

To urge the cleaning instrument 19 toward the saw blade 15, a spring 65 (see FIG. 2) is interposed between a bracket 61 fixed to the cleaning instrument support member 21 and another bracket 63 fixed to the cleaning instrument unit base 27. Therefore, the cleaning instrument support member 21 can be always urged toward the saw blade 15 in such a direction as to increase the overlap of the cleaning instrument 19 with the saw blade 15.

Further, to adjust the overlap of the cleaning instrument 19 with the saw blade 15, a pivotal cleaning instrument stopper member 23 is disposed in contact with the cleaning instrument 19. Therefore, when the pivotal cleaning instrument stopper member 23 is Located in position, it is possible to keep constant the overlap of the cleaning instrument 19 with the saw blade 15, because the movement of the cleaning instrument 19 toward the saw blade 15 can be restricted.

As shown in FIG. 2, the pivotal cleaning instrument stopper member 23 is fixed to a pin 67 pivotally supported by a bracket (not shown) disposed at the lower portion of the cleaning instrument unit base 27. A crank member 69 is fixed to the pin 67.

Further, to pivot the pin 67, that is, to pivot the pivotal cleaning instrument stopper member 23, a hydraulic cylinder 71 is mounted at the lower portion of the cleaning instrument unit base 27. A piston rod 71R formed integral with a piston 71P is reciprocatingly fitted to the hydraulic cylinder 71. An end of the crank member 69 is pivotally linked to the end of the piston rod 75R via a small pin 73.

In the construction as described above, when working fluid is supplied to the hydraulic cylinder 71, since the piston rod 71R is projected from the cylinder 71, the pivotal cleaning instrument stopper member 23 is pivoted clockwise through the crank member 69 and then stopped at a predetermined position a distance away from the tooth end of the saw blade 15. Therefore, this cleaning instrument (19) position, that is, the overlap of the cleaning instrument 19 with the saw blade 15, can be adjusted by the pressure of the hydraulic fluid supplied to the hydraulic cylinder 71. Under the condition that the circumference of the cleaning instrument 19 is in contact with the pivotal cleaning instrument stopper member 23 (so that the overlap of the cleaning instrument 19 with the tooth end of the saw blade 15 has been adjusted), the cleaning instrument position fixing device 25 is actuated to fix the bracket support member 21 to the bracket 29 of the saw blade housing 9, with the result that it is possible to maintain a predetermined overlap of the cleaning instrument 19 with the saw blade 15.

Under these conditions that the cleaning instrument support member 21 has been fixed to the bracket 29 with the cleaning instrument position fixing device 25, when the working fluid is discharged from the hydraulic cylinder 71, the piston rod 71R is retracted into the hydraulic cylinder 71 by an elastic force of a return spring 75, so that the pivotal cleaning instrument stopper member 23 is pivoted counterclockwise away from the cleaning instrument 19.

In summary, in the sawdust removing apparatus according to the present invention, the cleaning instrument 19 can be located relative to the saw blade 15 as follows: first, the pivotal cleaning instrument stopper member 23 is positioned at a required adjust position by actuating the hydraulic cylinder 71; secondly, the cleaning instrument support member 21 is released by actuating the cleaning instrument position fixing device 25 to bring the cleaning instrument 19 into contact with the pivotal cleaning instrument stopper member 23, so that the overlap of the cleaning instrument 19 with the tooth end of the saw blade 15 can be adjusted at a constant rate; thirdly, the cleaning instrument support member 21 is fixed to the bracket 29 of the saw blade housing 9 by the cleaning instrument position fixing device 25; fourthly, the pivotal cleaning instrument stopper member 23 is moved away from the cleaning instrument 19 by deactuating the hydraulic cylinder 71 to separate the pivotal cleaning instrument stopper member 23 from the cleaning instrument 19.

Accordingly, in the sawdust removing apparatus according to the present invention, since the pivotal cleaning instrument stopper member 23 can be held at a position a distance away from the cleaning instrument 19, it is possible to reduce the frictional resistance between the rotating cleaning instrument 19 and the pivotal cleaning instrument stopper member 23 and thereby to rotate the cleaning instrument 19 smoothly at a high speed under a low load. In addition, since the cleaning instrument support member 21 can be fixed to the bracket 29 of the saw blade housing 9 by the cleaning instrument position fixing device 25, even if the saw blade 15 vibrates, it is possible to prevent the cleaning instrument 19 from being vibrated by the vibrating saw blade 15.

As described above, after the overlap of the cleaning instrument 19 with the tooth end of the saw blade 15 has been kept at a predetermined value, work W is sawed. When the work W is being sawed, sawdust adhering to the saw blade 15 is removed by the cleaning instrument 19. Further, when the cleaning instrument 19 has been worn off gradually, the stopper member 23 is actuated again from the separate position to the adjust position; the cleaning instrument support member 21 is released by the cleaning instrument position fix device 25 to bring the cleaning instrument 19 into contact with the pivotal cleaning instrument stopper member 23 again by an elastic force of the spring 65, so that the overlap of the cleaning instrument 19 with the tooth end of the saw blade 15 can be adjusted again at another constant value.

The above-mentioned adjustment of the overlap of the cleaning instrument 19 with the saw blade 15 is effected whenever the work W or a predetermined number of works W have been sawed away. Otherwise, the overlap adjustment is repeated whenever a sum total of the crosssectional areas of work W sawed reaches a predetermined value.

Further, after the work W has been sawed at a constant overlap of the cleaning instrument 19 with the saw blade 15, when the cleaning instrument 19 is worn away considerably, the old cleaning instrument 19 must be replaced with a new cleaning instrument 19. To facilitate the replacement work of the cleaning instrument 19, in the sawdust removing apparatus according to the present invention, a cleaning instrument life time sensor 79 is provided to detect the life time (the upper wear limit) of the cleaning instrument 19.

In more detail, as shown in FIG. 2, a cleaning instrument stopper screw 77 is mounted on the cleaning instrument unit base 27 to prevent the cleaning instrument support member 21 from being moved toward the saw blade 15 excessively. Further, the cleaning instrument life time sensor 79 (e.g., a contact switch, a proximity switch, etc.) is attached to the cleaning instrument support member 21 at such a position as to face one end of the cleaning instrument stopper screw 77. Therefore, when the cleaning instrument 19 has been worn away beyond a predetermined value, since the cleaning instrument life time sensor 79 is brought into contact with end of the cleaning instrument stopper screw 77, the cleaning instrument life time sensor 79 (switch) is turned on, for instance when the cleaning instrument support member 21 is released from the bracket 29 by releasing the cleaning instrument position fixing device 25. Therefore, it is possible to detect an excessive wear of the cleaning instrument 19, that is, to indicate the need of the replacement for cleaning instrument 19 with a new one in a timely manner. Further, the same effect can be obtained when the cleaning instrument stopper screw 77 is attached to the cleaning instrument support member (21) side and the sensor 79 is attached to the cleaning instrument unit base (27) side.

Further, in FIG. 2, a cleaning instrument separating device 81 is mounted on the cleaning instrument unit base 27 to bring the cleaning instrument support member 21 away from the saw blade 15. The cleaning instrument separating device 81 is actuated when work W is not sawed by the saw blade 15, to separate the cleaning instrument support member 21 away from the saw blade 15.

In this embodiment, the cleaning instrument separating device 81 is composed of a hydraulic cylinder 83 and a piston rod 83R. When the hydraulic cylinder 83 is actuated, the end of the piston rod 83R urges the cleaning instrument support member 21 in the clockwise direction about the hinge pin 31 (FIG. 4) to separate the cleaning instrument 19 from the saw blade 15.

Therefore, when work W is not sawed by the sawed blade 15, the cleaning instrument position fixing device 25 is actuated to release the cleaning instrument support member 21. Under these conditions, when the piston rod 83R of the hydraulic cylinder 83 is actuated to project the piston rod 83R, since the cleaning instrument support member 21 is pivoted clockwise against an elastic force of the spring 65, the cleaning instrument 19 can be separated from the saw blade 15. Accordingly, when work W is not sawed, it is possible to prevent the cleaning instrument 19 from being worn off unnecessarily and thereby to improve the lift time of the cleaning instrument 19, owing to the separation of the cleaning instrument 19 from the saw blade 15.

Figure 5:
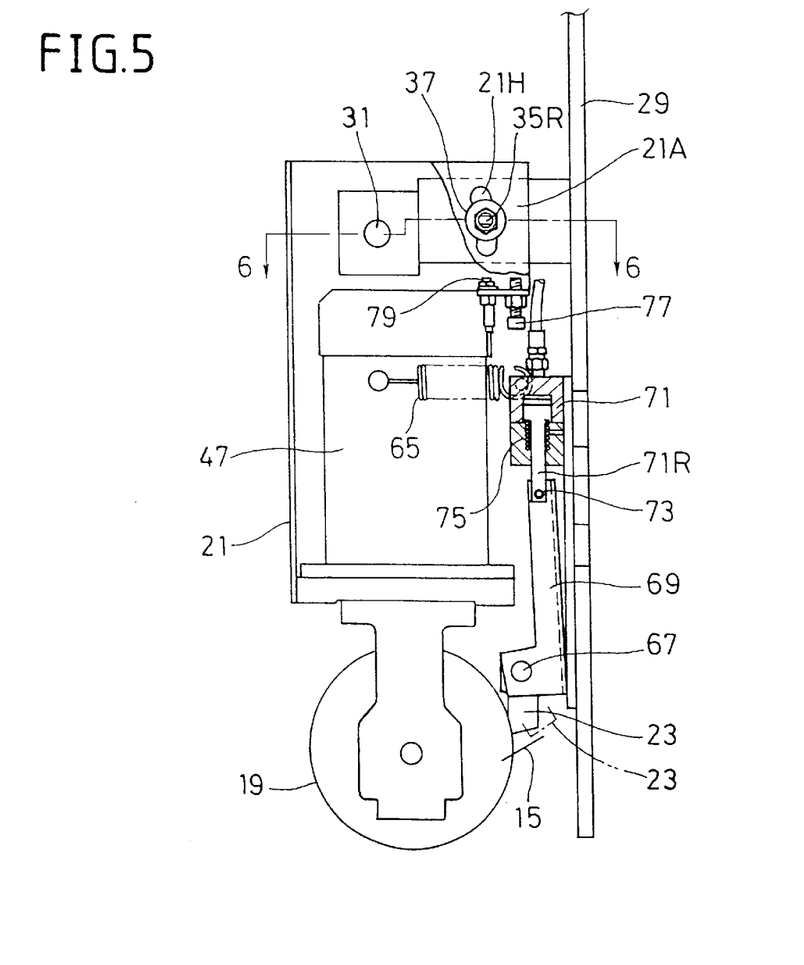
FIG. 5 is a side, partially cross-sectional view showing a second embodiment of the sawdust removing apparatus for a saw machine according to the present invention.
Figure 6:
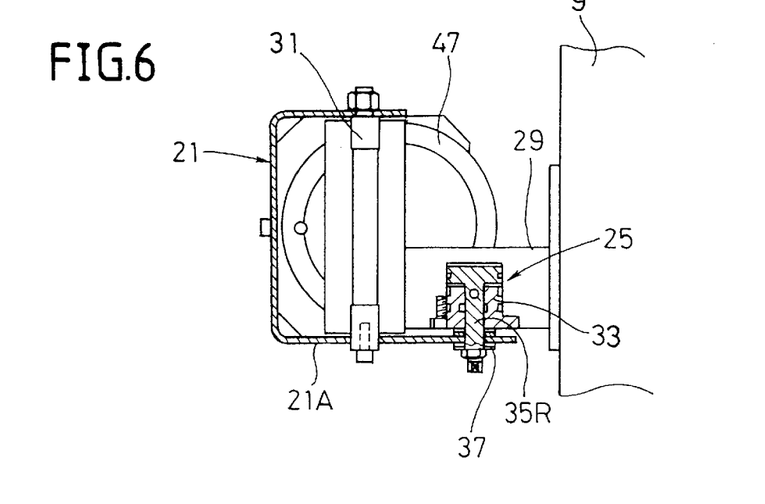
FIG. 6 is an enlarged cross-sectional view, taken along the line 6—6 in FIG. 5.

With reference to FIGS. 5 and 6, a second embodiment of the present invention will be described hereinbelow. The second embodiment is basically the same as the first embodiment, except for the cleaning instrument position fixing device 25. Therefore, the same reference numerals have been retained for similar elements or parts which have the same functions as with the case of the first embodiment, without repeating any detailed description thereof.

In the cleaning instrument position fixing device 25 of this second embodiment, the hinge pin 31 and the hydraulic cylinder 33 are separated from each other in position (see FIG. 6). In more detail, the piston rod 35R is passed through a circular arc-shaped slot 21H formed in one side surface 21A of the cleaning instrument support member 21 and fitted to the cylinder block 33. In this embodiment, when working fluid is supplied into the cylinder block 33 through the fluid tube (not shown), it is also possible to fixing the cleaning instrument support member 21 to the bracket 29 fixed to the saw blade housing 9. Further, as shown in FIG. 5, the cleaning instrument stopper screw 77 and the cleaning instrument life time sensor 79 are both attached to the cleaning instrument support member 21. In this embodiment, the same effect as with the case of the first embodiment can be obtained.

Figure 7:
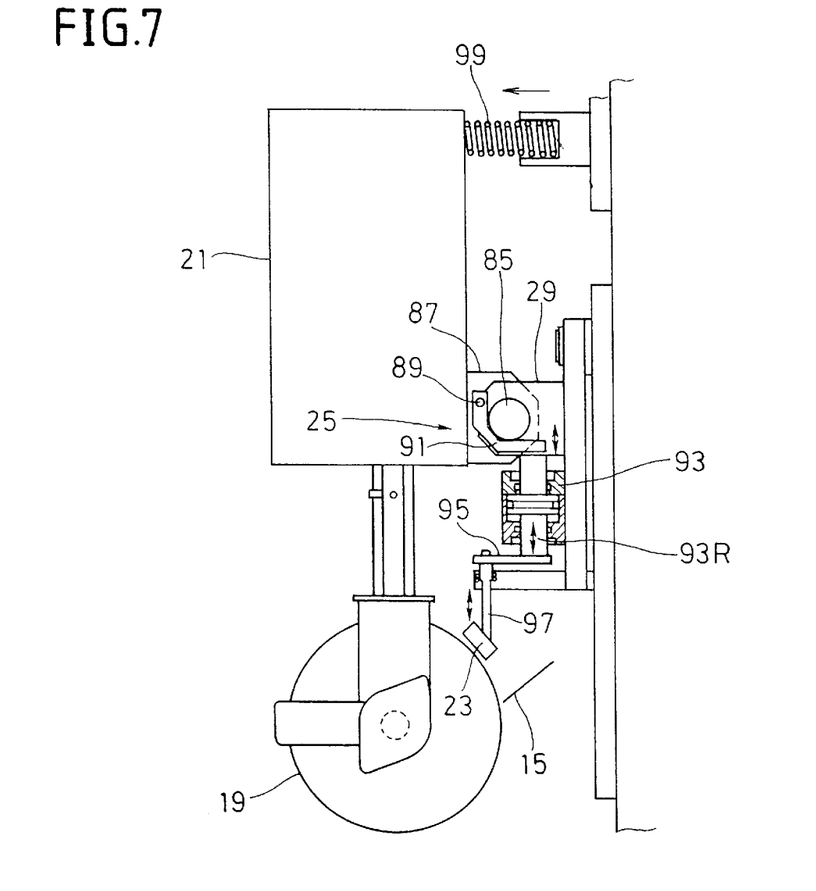
FIG. 7 is a side, partially cross-sectional view showing a third embodiment of the sawdust removing apparatus for a saw machine according to the present invention, in which an actuating device for actuating the cleaning instrument stopping device and the cleaning instrument position fixing device are combined with each other.

FIG. 7 shows a third embodiment of the present invention, in which the cleaning instrument position fixing device 25 for fixing the cleaning instrument support member 21 to the bracket 29 and the pivotal cleaning instrument stopper member 23 are both actuated by a single actuating device (i.e., a single hydraulic cylinder 93). In other words, both the cleaning instrument position fixing device 25 and the adjustable cleaning instrument stopping device 23 and 71 are combined with each other.

In more detail, as the cleaning instrument position fixing device 25, a pivotal axle 85 is fixed to a bracket 87 of the cleaning instrument support member 21 and further pivotally supported by another bracket 29 fixed to the unit base 27. An L-shaped brake lever 91 is pivotally supported by a pin 89 attached to the bracket 29 at one end thereof in such a way as to be urged against the pivotal axle 85.

On the other hand, to urge the brake lever 91 against the pivotal axle 85, a hydraulic cylinder 93 and a piston rod 93R are provided as the brake level actuating device. The piston rod 93R is projected from the hydraulic cylinder 93 on both ends of the hydraulic cylinder 93. The upper end of the piston rod 93R is in contact with the brake lever 91, and the lower end of the piston rod 93R is in contact with another lever 95. This lever 95 supports another rod 97 for supporting a pivotal cleaning instrument stopper member 23. Further, a spring 99 is interposed between the cleaning instrument support member 21 and the saw blade housing 9.

In the above structure, when the hydraulic cylinder 93 is actuated to lower the piston rod 93R, since the upper end of the piston rod 93R is moved away from the brake lever 91, the pivotal axle 85 of the cleaning instrument support member 21 is released from the cleaning instrument position fixing device 25, so that the cleaning instrument support member 21 can be pivoted counterclockwise (toward the saw blade 15) by an elastic force of the spring 99 in FIG. 7. On the other hand, since the pivotal cleaning instrument stopper member 23 is also lowered by the piston rod 93R together with the lever 95 and the rod 97, the cleaning instrument 19 mounted on the cleaning instrument support member 21 is brought into contact with the pivotal cleaning instrument stopper member 23, so that the overlap rate of the cleaning instrument 19 with the saw blade 15 can be adjusted.

Under these conditions that the cleaning instrument 19 is in contact with the pivotal cleaning instrument stopper member 23, when the piston rod 93R is moved upward, since the end of the brake lever 91 is pushed upward by the upper end of the piston rod 93R, the brake lever 91 is urged against the pivotal axle 85, so that the cleaning instrument support member 21 can be fixed to the bracket 29 via the pivotal axle 85. Further, when the piston rod 93R moves upward, although the pivotal cleaning instrument stopper member 23 is separated from the cleaning instrument 19, since a distance between the upper end of the piston rod 93R and the brake lever 91 is determined to be extremely small, the pivotal axle 85 can be fixed to the bracket 29 roughly simultaneously when the piston rod 93R starts to move upward.

In this third embodiment, the hydraulic cylinder 93 for actuating the cleaning instrument position fixing device (the brake lever 91 for fixing the cleaning instrument support member 21) and the hydraulic cylinder 93 for actuating the pivotal cleaning instrument stopper member 23 between the adjust position and the separate position of the cleaning instrument 19 relative to the saw blade 15 are constructed to be one and the same hydraulic cylinder 93, and thus it is possible to simplify the structure of the sawdust removing apparatus.

Figure 8:
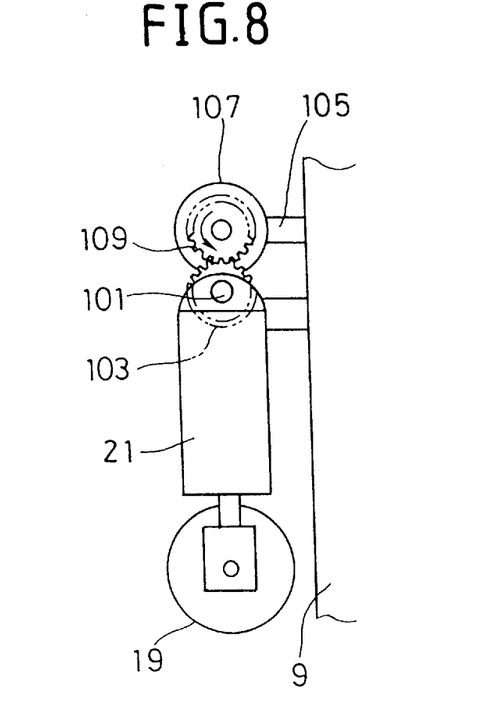
FIG. 8 is a side view showing another modification of the sawdust removing apparatus, by which the cleaning instrument support member can be oscillated by a gear mechanism.

FIG. 8 shows a modification of the cleaning instrument separating device 81, in which a gear mechanism for pivoting the cleaning instrument support member 21 relative to the saw blade housing 9 is used. In more detail, a driven gear 103 is attached to the pivotal axle 101 of the cleaning instrument support member 21. Further, a drive gear 109 is attached to a drive shaft of an actuator (e.g., motor) 107 mounted on a bracket 105 fixed to the saw blade housing 9. The two gears 101 and 109 are in mesh with each other. Therefore, when the actuator 107 is driven, since the drive gear 109 is rotated clockwise or counterclockwise, it is possible to pivot the cleaning instrument support member 21 clockwise or counterclockwise, so that the cleaning instrument 19 can be moved toward or away from the saw blade 15, that is, between the sawing position and the nonsawing position, without use of any hydraulic cylinder.

Figure 9A:
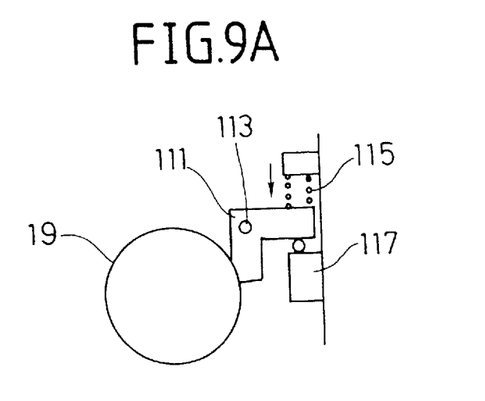
FIGS. 9A and 9B are illustrations for assistance in explaining another modification of the cleaning instrument life time sensor.
Figure 9B:
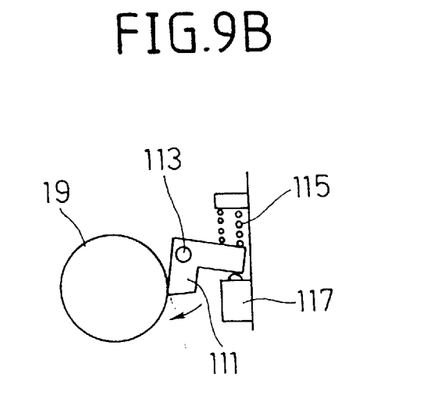

FIGS. 9A, 9B show a modification of the cleaning instrument life time sensor. In this modification, a bellcrank shaped detection lever 111 is interposed between the cleaning instrument 19 and a sensor (e.g., a limit switch) 117. The detection lever 111 is pivotally supported by a pin 113 and is urged by a spring 115 toward the sensor 117. The one end of the detection lever 111 is in contact with the outer circumference of the cleaning instrument 19 and the other end of the detection lever 111 is in contact with a movable contact of the sensor switch 117.

Therefore, when the cleaning instrument 19 is worn out, since the detection lever 111 is pivoted clockwise by the spring 115, the sensor (limit switch) 117 is turned on, so that it is possible to detect that the cleaning instrument 19 reaches a wear-out limit and thereby the old cleaning instrument 19 must be replaced with a new one.

As described above, in the sawdust removing apparatus according to the present invention, when work W is being sawed, since the cleaning instrument support member 21 can be fixed at an appropriate position away from the saw blade 15 by the cleaning instrument position fixing device 25, it is possible to prevent the cleaning instrument 19 from being vibrated by the saw blade 15, so that it is possible to prevent the cutting precision from being lowered due to vibration, and further to prevent the cleaning instrument 19 from being worn off excessively.

Further, since the overlap of the cleaning instrument 19 with the saw blade 15 can be adjusted by the adjustable cleaning instrument stopping device 23 and 71 to any required value, and further since the pivotal cleaning instrument stopper member 23 can be moved between the adjustment position (at which the cleaning instrument movement is restricted) and the separation position (at which the cleaning instrument 19 is kept away from the pivotal cleaning instrument stopper member 23), it is possible to prevent the cleaning instrument 19 from being worn off unnecessarily by the pivotal cleaning instrument stopper member 23 without any contact resistance between the cleaning instrument 19 and the pivotal cleaning instrument stopper member 23, so that the cleaning instrument 19 can be rotated smoothly.

Further, when work W is not sawed by the saw blade 19, since the cleaning instrument 19 can be separated from the saw blade 15 by the cleaning instrument separate device (the hydraulic cylinder 81 or the gear mechanism 101 and 108) via the cleaning instrument support member 21, it is possible to prevent the cleaning instrument 19 from being worn off unnecessarily and thereby to improve the life time of the cleaning instrument 19.

Further, since the cleaning instrument life time sensor 79 for detecting the life time (wear limit) of the cleaning instrument 19 is provided, it is possible to detect the timing at which the cleaning instrument 19 must be replaced with a new one, so that sawdust produced by the saw blade 15 can be removed securely.

Furthermore, the sawdust removing apparatus according to the present invention can be mounted on the cleaning instrument unit base 27 all together, and it is possible to manufacture and mount the sawdust removing apparatus on the conventional saw blade housing 9, that is, the conventional saw machines of any types, without need of any additional modification of the saw machine.

What is claimed is:

1. A sawdust removing apparatus for a saw machine, comprising:
    a saw blade housing for rotatably supporting a saw blade for sawing work;
    cleaning instrument means for removing sawdust adhering to the saw blade when said work is being sawed;
    cleaning instrument support means movably supported by said saw blade housing for rotatably supporting said cleaning instrument means;
    cleaning instrument position adjusting means mounted on said saw blade housing for adjusting an amount of overlap of said cleaning instrument means with the saw blade;
    cleaning instrument position fixing means mounted on said saw blade housing for fixing said cleaning instrument support means after the amount of overlap of said cleaning instrument means with the saw blade has been adjusted by said cleaning instrument position adjusting means; and
    cleaning instrument separating means mounted on said saw blade housing for pivoting said cleaning instrument support means to separate said cleaning instrument means from the saw blade when work is not being sawed.

2. The sawdust removing apparatus of claim 1, wherein said cleaning instrument position adjusting means adjusts the amount of overlap of said cleaning instrument means with the saw blade between an adjustment position in contact with said cleaning instrument means and a remote position away from said cleaning instrument means.

3. The sawdust removing apparatus of claim 1, further comprising cleaning instrument life time sensing means interposed between said saw blade housing and said cleaning instrument support means for detecting a wear of said cleaning instrument means.

4. The sawdust removing apparatus of claim 3, wherein said cleaning instrument life time sensing means comprises a proximity switch.

5. The sawdust removing apparatus of claim 1, further comprising cleaning instrument life time sensing means interposed between said saw blade housing and said cleaning instrument means for detecting a wear of said cleaning instrument means.

6. The sawdust removing apparatus of claim 5, wherein said cleaning instrument life time sensing means comprises a proximity switch.

7. The sawdust removing apparatus of claim 1, further comprising a cleaning instrument spring interposed between said saw blade housing and said cleaning instrument support means for urging said cleaning instrument means toward the saw blade.

8. The sawdust removing apparatus of claim 1, wherein said cleaning instrument position adjusting means comprises:
    a pivotal cleaning instrument stopper member; and
    a hydraulic cylinder for actuating said pivotal cleaning instrument stopper member toward and away from an outer circumferential surface of said cleaning instrument means.

9. The sawdust removing apparatus of claim 1, wherein said cleaning instrument position fixing means comprises:
    a push member; and
    a hydraulic cylinder device interposed between said saw blade housing and said cleaning instrument support means, for urging said push member against said cleaning instrument support means to fixing said cleaning instrument support means to said saw blade housing.

10. The sawdust removing apparatus of claim 1, further comprising a single unit including said cleaning instrument position adjusting means and said cleaning instrument position fixing means, and wherein said single unit comprises:
    a hydraulic cylinder;
    a piston rod movably fitted to said hydraulic cylinder;
    a brake lever member associated with one end of said piston rod for braking a pivotal motion of said cleaning instrument support means relative to said saw blade housing when said hydraulic cylinder is actuated; and
    a moving lever member associated with the other end of said piston rod for moving a pivotal cleaning instrument stopper member of said cleaning instrument position adjusting means away from said cleaning instrument means when said hydraulic cylinder is actuated.

11. The sawdust removing apparatus of claim 1, wherein said cleaning instrument separating means is a hydraulic cylinder.

12. The sawdust removing apparatus of claim 1, wherein said cleaning instrument separating means comprises a gear mechanism interposed between said saw blade housing and said cleaning instrument support means for moving said cleaning instrument means toward and away from the saw blade.

* * * * *